Patented Apr. 24, 1951

2,550,631

UNITED STATES PATENT OFFICE 2,550,631

SHUFFLEBOARD WAX COMPOSITION AND METHOD OF MAKING SAME

William G. Young, Sr., South Plainfield, N. J.

No Drawing. Application February 27, 1947, Serial No. 731,399

12 Claims. (Cl. 117—100)

The present invention relates to a waxing material, suitable for waxing shuffleboards and suitable for waxing other surfaces.

In accordance with the present invention, I start with walnut shells, or other hard nut shells. Walnut shells are preferred. Soft shells, such as peanut shells and the like, would not be satisfactory.

The shells are first crushed or ground to pass through a screen, say 40 mesh (U. S. standard) but the exact size of the screen is somewhat immaterial. The comminuted material is then run over an 80-mesh sieve, to remove the fine material or dust-like particles. This will leave the comminuted shell in the form of more or less rounded particles, substantially free from material of a flour-like particle size.

The said material is placed in a heater and agitating device in which a plurality of blades is constantly rotated to stir the said material, for about a half hour while being heated up to 200° F., in order to drive out substantially all of the moisture. Then I add e. g. as a spray, to every 100 lbs. of the comminuted shells, about 10 lbs. of melted wax, which material preferably has a melting point of about 165° to 175° F. The most satisfactory waxing substance, which I have used, is a mixture of 88% paraffin wax of about 128 to 130° F. melting point and about 12% of No. 1 prime carnauba wax (melting point about 185° F.).

The mixer is continued to operate, while heating, until the steaming point is reached, at which time the pores of the shells have been sealed to prevent moisture from re-entering, and an even distribution of the wax has been accomplished. In this condition the rounded particles of nut shell will be found to have become somewhat impregnated and coated with the molten wax. The resulting product is then allowed to cool off and when the cooling has been accomplished, it may be found that the hardening of the wax on the surface of the mass of rounded nut shell particles has united the same into a solid piece or into a number of solid pieces. This is then broken up and sifted, say through a 40 or 50 mesh screen, and is then ready for packaging and selling. It can be put into tin cans with perforated tops, for sprinkling upon the top of the wooden shuffleboards. The shuffleboards are preferably of smooth polished maple, mounted on legs. It will be understood that the shuffleboard game is played by sliding round iron discs over the surface of the board, lengthwise thereof, and my product is first sprinkled upon the surface of the shuffleboard before the discs are placed thereon. The nut shell particles being more or less rounded, act to some extent as balls over which the metal discs slide or roll, constituting in effect small ball-bearings.

Heretofore I have used sawdust and corn-meal, both impregnated with wax or coated with wax, but the comminuted nut shell is found to be substantially better than either of the above.

The treated particles of nut shell do not readily absorb moisture, in fact they will not take up moisture from the atmosphere even on hot, muggy days, whereas the products made from corn-meal and wax or sawdust and wax will absorb moisture to an undesirable extent, during such condition.

The above shuffleboard waxing material has been found to be advantageous in that while keeping the boards in proper condition, the discs, if projected with the same force, travel faster over the above-described product than over any of the other shuffleboard waxing compositions heretofore employed, including those made from corn-meal and wax and those made from sawdust and wax. This I believe to be due to the rounded character of the nut-shell particles.

I claim;

1. Comminuted hard nut shells of substantially rounded shape of particle, which particles are all small enough to pass a screen of about 40 mesh size, but substantially free from very fine powder, such particles being each impregnated and coated with a wax composition, the amount of such wax composition being only about 10% of the amount of said comminuted nut shell, and which has a melting point of about 165° to 175° F., said product being a mass of discrete granules, capable of being poured.

2. Product as in claim 1 in which the wax composition is a blend of a large amount of paraffin wax and a much smaller but substantial amount of carnauba wax of a higher melting point than said paraffin wax.

3. Comminuted hard nut shell, composed largely of rounded particles passing a 40 mesh screen, which rounded particles are coated and impregnated with a mixture of waxes which mixture melts at about 165–175° F., the amount of said wax mixture being about one-tenth of the amount of such shell particles, said product being in a loose non-lumped condition, and which product can be poured as a granular solid material, composed of discrete granules.

4. Comminuted hard nut shell material, in the form of a free flowing mass of separate discrete rounded particles, all passing a 40 mesh screen, such particles being coated and somewhat impregnated with a wax composition having a melting point about 165–175° F., the total weight of such wax composition being about 10% of the amount of such rounded particles of nut shell material, such product being free from abrasives and such product being substantially free from fine solid nut shell material of a particle size passing an 80 mesh screen.

5. Comminuted hard nut shells, the particles of which are of a somewhat rounded shape and all passing a screen of about 40 mesh, said rounded particles being impregnated and coated with a minor fraction of their weight of a wax composition which has a melting point of about 165° to 175° F., and such product being in the form of a mass of free-flowing rounded granular discrete particles.

6. Product as in claim 5 in which the wax composition is a mixture of paraffin wax and carnauba wax.

7. A lubricant for use on a shuffleboard which is a pourable mass of rounded discrete particles of a size passing a 40 mesh screen, composed of comminuted dried hard nut shell, the particles of which are coated and impregnated with wax composition which is substantially solid at ordinary atmospheric temperature, but which wax composition is itself capable of being melted without decomposition at substantially higher temperatures, the amount of said comminuted shell being about ten times as great as the amount of said wax composition, such product being in a loose non-compacted condition in which it may be strewn over the surface of a shuffleboard.

8. A lubricant for use on a shuffleboard which is a pourable mass of rounded discrete particles of a size passing a 40 mesh screen, composed of comminuted dried hard nut shell, the particles of which are coated and impregnated with wax composition which is substantially solid at ordinary atmospheric temperature, but which wax composition is itself capable of being melted without decomposition at about 165° F. to 175° F., the weight of such waxy material being only a minor fraction of the weight of said comminuted nut shell, and such product being in a loose non-lumped condition in which it may be strewn over the surface of a shuffleboard.

9. A process which comprises the steps of drying rounded particles of hard nut shell material, all passing a 40 mesh screen, and substantially all coarser than 80 mesh, and coating and somewhat impregnating such rounded particles with a molten wax which is a solid at normal atmospheric temperatures, the weight of such wax applied being only a small fraction of the weight of the mass of said rounded particles, whereby a free flowing mass of said coated rounded particles, suitable for spreading upon a shuffleboard surface is produced.

10. A process of producing a shuffleboard dressing material which is free from abrasive qualities, which comprises drying a free-flowing mass of rounded particles of hard nut shell and coating and impregnating such particles while already hot, with a hot molten wax composition which is composed entirely of wax which at normal room temperature is a waxy solid, the amount of such wax composition being only about 10% of the amount of such nut shell particles, substantially all of such nut shell particles being capable of passing through a 40 mesh screen but held upon an 80 mesh screen, whereby a coated and impregnated material in the form of a free-flowing mass of granules, is obtained.

11. A process of producing a material for application to a shuffleboard which comprises crushing walnut shells into rounded particles all passing a 40 mesh screen, heating such rounded particles to above 165° F. but to below 212° F., and spraying such so heated particles, while being agitated, with a molten wax composition which latter has a melting point of about 165° to 175° F., and which molten mixture is free of normally liquid solvents, the amount of such wax composition being only a minor fraction of the amount of such rounded particles of walnut shell material, continuing the heating and agitation of such mass of material until the particles of walnut shell are all substantially sealed and until the said amount of wax composition is well distributed throughout the mass and then crushing the product after the addition of the wax and after the product has cooled.

12. A process of making a free-flowing material in the form of rounded discrete granules for waxing shuffleboard and like surfaces which comprises crushing walnut shells into rounded particles of greater size than 80 mesh and fines, removing the fines, heating the rounded particles to a temperature above 165° F. but not to substantially above the boiling point of water and agitating such material while applying thereto a molten normally solid wax composition melting at about 165–175° F., and continuing the agitation after such addition to allow said molten wax composition to be taken up by said shell material, the amount of such wax composition being only about 10% of the amount of such rounded particles of shell material, and the latter all passing a 40 mesh screen.

WILLIAM G. YOUNG, Sr.

REFERENCES CITED

The following references are of record in the file of this patent:

UNITED STATES PATENTS

| Number | Name | Date |
|---|---|---|
| 613,750 | Bowdlear | Nov. 8, 1898 |
| 910,569 | Peco | Jan. 26, 1909 |
| 1,940,530 | Brogden et al. | Dec. 19, 1933 |
| 2,214,263 | Weihe | Sept. 10, 1940 |
| 2,319,182 | Van der Pyl | May 11, 1943 |
| 2,357,091 | D'Alelio | Aug. 29, 1944 |